United States Patent
Cohen

(10) Patent No.: US 6,169,513 B1
(45) Date of Patent: Jan. 2, 2001

(54) THINNED MULTIPLE BEAM PHASED ARRAY ANTENNA

(75) Inventor: George S. Cohen, Santa Rosa, CA (US)

(73) Assignee: Space Systems/Loral, Inc., Palo Alto, CA (US)

(*) Notice: Under 35 U.S.C. 154(b), the term of this patent shall be extended for 0 days.

(21) Appl. No.: 09/435,516

(22) Filed: Nov. 8, 1999

Related U.S. Application Data

(62) Division of application No. 09/030,288, filed on Feb. 25, 1998, now Pat. No. 6,011,512.

(51) Int. Cl.[7] .................................................. H04B 7/185
(52) U.S. Cl. ............................................. 342/354; 342/372
(58) Field of Search ................................ 342/81, 154, 157, 342/368, 354, 372, 373

(56) References Cited

U.S. PATENT DOCUMENTS

| | | | |
|---|---|---|---|
| 3,953,857 | 4/1976 | Jenks ................................ | 343/705 |
| 4,521,781 | 6/1985 | Campi et al. ..................... | 343/846 |
| 4,652,880 | 3/1987 | Moeller et al. ................... | 342/373 |
| 4,734,700 | 3/1988 | Brunner ............................ | 342/373 |
| 4,766,438 | 8/1988 | Tang ................................. | 342/372 |
| 4,799,065 | 1/1989 | Thompson ........................ | 343/779 |
| 4,837,580 * | 6/1989 | Frazita ............................. | 342/374 |
| 4,870,423 * | 9/1989 | Bolomey .......................... | 342/368 |
| 5,051,754 | 9/1991 | Newberg .......................... | 342/375 |
| 5,283,587 * | 2/1994 | Hirshfield et al. ............... | 342/372 |
| 5,333,001 * | 7/1994 | Profera ............................. | 342/373 |
| 5,353,031 * | 10/1994 | Rathi ................................ | 342/372 |
| 5,422,647 | 6/1995 | Hirshfield et al. ............... | 342/354 |
| 5,434,575 * | 7/1995 | Jelinek et al. ................... | 342/365 |
| 5,504,493 | 4/1996 | Hirshfield ........................ | 342/372 |
| 5,539,415 | 7/1996 | Metzen et al. ................... | 343/700 |
| 5,543,801 | 8/1996 | Shawyer ........................... | 342/354 |
| 5,548,292 | 8/1996 | Hirshfield et al. ............... | 342/324 |
| 5,623,269 | 4/1997 | Hirshfield et al. ............... | 342/354 |
| 5,818,386 | 10/1998 | Belisle ............................. | 342/372 |
| 5,870,063 | 2/1999 | Cherrette ......................... | 343/85.3 |

* cited by examiner

*Primary Examiner*—Thomas H. Tarcza
*Assistant Examiner*—Dao L. Phan
(74) *Attorney, Agent, or Firm*—Perman & Green, LLP

(57) ABSTRACT

A thinned multiple beam phased array antenna which includes, in a sending array configuration, an antenna element, beam forming network, feeding circuits, a phase and gain controller, and a phase control algorithm storage unit. A feeding circuit is coupled to an associated antenna element and the beam forming network, and passes a beam forming signal between the antenna element and the beam forming network. The antenna element preferably includes a plurality of radiators and a plurality of band pass filters, wherein a band pass filter is dedicated to each radiator. The beam forming network preferably includes a stripline power divider and a power distributor. The feeding circuits preferably include a plurality of impedance-matching isolators, a plurality of solid state power amplifiers, a plurality of n:1 signal combiners, a plurality of monolithic microwave integrated circuits (MMICs), and a plurality of phase shifters. This configuration is integrated into a single system which provides flexibility of beam placement, narrow beam width, simultaneous, independent multiple beams and reduces the overall system weight and cost.

2 Claims, 12 Drawing Sheets

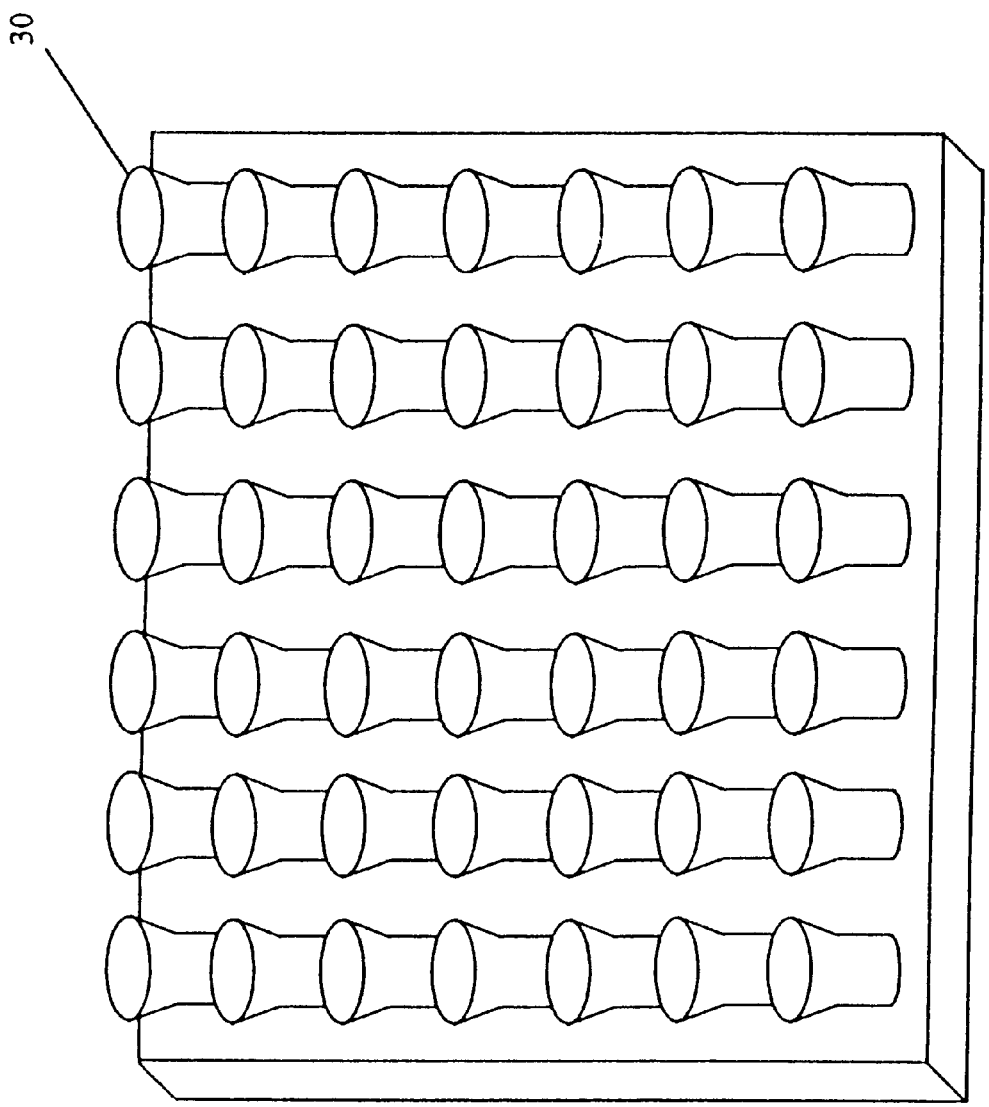

THINNED MULTIPLE BEAM PHASED ARRAY ANTENNA

CROSS-REFERENCE TO RELATED APPLICATION

This is a divisional patent application of application Ser. No. 09/030,288 filed Feb. 25, 1998, now U.S. Pat. No. 6,011,512.

FIELD OF THE INVENTION

This invention relates to satellite communications systems including antennas and devices for receiving and transmitting microwave signals, specifically, to systems including multiple beam phased array antennas, antenna feeds, and beam forming networks.

BACKGROUND OF THE INVENTION

In satellite communication systems, microwave signals are beamed between one or more ground stations and a satellite, or from one satellite to another satellite. In the ground station to satellite communication systems, each beam of signals is controlled to ensure a specific area of coverage, for example, a wide beam may cover a large area such as a country or continent, while a narrow beam may cover a small area such as a specific ground station. Additionally, a plurality of beams may be simultaneously radiated to cover a plurality of independent coverage areas. This technique is commonly referred to as multiple beam coverage. The present invention addresses the generation and positioning of independent multiple beams.

Networks which include multiple beam phased array antennas and devices for transmitting and receiving microwave signals are known for satellite communication systems, as evidenced by, for example, U.S. Pat. No. 3,953,857, issued Apr. 27, 1976, entitled "Airborne Multi-mode Radiating and Receiving System", by F. Jenks. Other examples include U.S. Pat. No. 4,521,781, issued Jun. 4, 1985, entitled "Phase Scanned Microstrip Array Antenna", by Campi et. al.; U.S. Pat. No. 4,652,880, issued Mar. 24, 1987, entitled "Antenna Feed Network", by Moeller et. al.; U.S. Pat. No. 4,734,700, issued Mar. 29, 1988, entitled "Group Antenna with Electronically Phased-Controlled Beam", by Brunner; U.S. Pat. No. 4,766,438, issued Aug. 23, 1988, entitled "Three Dimensional Feed Through Lens with Hemispherical Coverage", by Tang; and U.S. Pat. No. 4,799,065, issued Jan. 17, 1989, entitled "Reconfigurable Beam Antenna", by Thompson.

The conventional multiple beam phased array antennas and beam forming networks employ machined or electroformed horns, separate filters, and delay line or ferrite phase shifters. These devices are coupled to wave guides and coaxial transmission lines, as well as other microwave components. These conventional configurations are relatively large and heavy. Large and heavy antennas are a disadvantage because the antennas are typically deployed in spacecraft where increased size and weight lead to increased launch costs. The conventional phased array antennas are also difficult and expensive to implement on a recurring basis because their components, the horns, filters and phase shifters, are individual electrical devices whose characteristics may vary from device to device. Additionally, it is difficult and expensive to assemble these devices into antennas in a manner which ensures that uniform antenna characteristics are maintained throughout the array.

Recently, the number of satellites deployed in geosynchronous orbit about the earth has increased significantly. The increase in the number of deployed satellites has lead to an increase in the number of microwave signals being transmitted from both the deployed satellites and communication networks based on the surface of the earth. As a result, higher interference levels are being experienced as the deployed satellites and the earth based networks attempt to communicate.

Thus, there remains a need for an efficient, light weight, easy to implement satellite communication system that minimizes interference from other systems.

OBJECTS AND ADVANTAGES OF THE INVENTION

It is a first object and advantage of this invention to provide a reliable satellite communication system that transmits and receives microwave signals utilizing different spectral regions, or frequency bands, at high radio frequencies.

Another object and advantage of this invention is to provide an antenna designed to include flexible beam placement, narrow beam width, and reduced weight components.

Another object and advantage of this invention is to provide an antenna, antenna feeds, and a beam forming network that places two or more independent, narrow beams anywhere in the coverage area of the antenna.

Another object and advantage of this invention is to provide an antenna element design having a plurality of radiators, wherein a stochastic process is used to select radiator positions and beams within an array.

Further objects and advantages of this invention will become more apparent from a consideration of the drawings and ensuing description.

SUMMARY OF THE INVENTION

The foregoing and other problems are overcome and the objects of the invention are realized by apparatus in accordance with embodiments of this invention. More particularly, this invention is directed to providing a reliable satellite communication system that includes a multiple beam phased array antenna, antenna feeds, and beam forming networks.

To ensure reliable satellite communications, and lessen the effect of interference from other communication systems, this invention transmits microwave signals at different spectral regions at high radio frequencies. Additionally, this invention employs an improved antenna design. The improved antenna design integrates, into a single system, an antenna element, a beam forming network, and integrated circuits which feed a beam from the beam forming network to an associated antenna element. The integrated circuits are hereinafter simply referred to as a feeding circuit in a sending configuration, and a receiving circuit in a receiving configuration. The single system provides flexibility of beam placement, narrow beam width, and reduced system weight. Flexible beam placement enables large area coverage and allows the system to serve many sites in near real time with a high gain beam. Narrowing the beam width of the high gain beam allows the system to partially offset the added propagation losses experienced by transmissions at high radio frequencies. The remainder of the propagation losses are compensated for by adding transmitter power. Generally, added transmitter power results in an increase in the overall weight of the system. However, this invention negates the increased weight due to the added transmitter power by reducing the weight of the antenna element and beam forming network. In fact, this invention reduces the weight of the antenna element, beam forming network, the feeding circuits and the receiving circuits so that the entire antenna system is lighter than conventional antenna systems used in satellite communications systems.

In the preferred embodiment of the sending array configuration, the antenna elements include a plurality of radiators and a plurality of band pass filters. The beam forming network preferably includes a plurality of stripline power dividers and a plurality of power distributors. The feeding circuits preferably include a plurality of impedance-matching isolators, a plurality of solid state power amplifiers, a plurality of n:1 signal combiners, a plurality of monolithic microwave integrated circuits (MMICs), and a plurality of phase shifters. In the preferred embodiment, beam positioning and beam width control information is derived by a phase control algorithm. The phase control algorithm operating, for example from a ground station, sends commands to a phase control algorithm storage unit in the satellite. The phase control algorithm storage unit, in cooperation with a phase and gain controller, uses the ground commands to derive control information which is passed to the feeding circuits supporting selected radiators. As the feeding circuits receive a signal from the beam forming network the control information is interpreted to modify the phase and gain of the signal. The feeding circuits then pass the modified signal to the selected antenna elements where it is outputted as a radiated beam.

In the preferred embodiment of the receiving array configuration, the antenna elements include a plurality of radiators, a plurality of low noise amplifiers, and a plurality of drivers. The receiving circuit preferably includes a plurality of m:n power splitters (e.g., a plurality of 1:n power splitters) and a plurality of receiving chains. Each receiving chain includes a band pass filter, a MMIC chain and a phase shifter. As in the sending array configuration, the receiving array configuration receives beam positioning and beam width control information that is derived from a phase control algorithm. The phase control algorithm operating, for example from a ground station, sends commands to a phase control algorithm storage unit in the satellite. The phase control algorithm storage unit, in cooperation with a phase and gain controller, uses the ground commands to derive control information which is passed to the receiving circuits supporting selected radiators. As the receiving circuits receive a beam from the antenna elements, the control information is interpreted to modify the phase and gain of the receiving circuits. The receiving circuits then pass the modified, received beam to selected beam adders where a composite beam is assembled with the aid of beam detection circuitry (not shown).

According to the teachings of this invention, the antenna element, beam forming network, feeding circuits and receiving circuits send and receive microwave signals by means of the plurality of radiators. A set of radiators cooperate to send or receive the microwave signals. This invention preferably employs a stochastic selection process that identifies radiator positions. Radiators, located in the selected positions, transmit or receive a given microwave signal. The objective of the stochastic selection process is, for example, to form a beam to illuminate the desired region by employing only about 5% of the total population of radiators. Each pattern of radiators is independent and steerable within the antenna configuration. The stochastic selection process accomplishes this objective by employing an algorithm, for example a probability distribution, which randomly determines the location of radiators within the array. The selected locations minimize interference with adjacent beams while maximizing power efficiency of the antenna system.

For purposes of illustration, a transmission process is discussed which outlines the cooperation between the components of the antenna element, beam forming network, and feeding circuit. Before transmitting, a phase control algorithm, with commands inputted from a ground station, determines the desired angular position and beam width of the transmitted beam, that is, the control information discussed above. The phase and gain controller passes the control information from the phase control algorithm storage unit to the phase shifters located in each of the feeding circuits dedicated to each of the one or more radiators selected to transmit the beam. Each phase shifter receives the control information as a control input. Preferably, each feeding circuit configuration includes one or more phase shifters electrically coupled to one or more MMICs, the MMICs are electrically coupled to one or more n:1 signal combiners, the signal combiners are electrically coupled to a solid state amplifier, the amplifier is electrically coupled to an impedance matching isolator and the isolator is electrically coupled to a band pass filter. Thus, the radiated signal which is inputted by the stripline power divider to the feeding circuit at the signal input of each phase shifter is modified to produce a phase controlled and filtered signal at each of the set of radiators selected to transmit the beam.

BRIEF DESCRIPTION OF THE DRAWINGS

The above set forth and other features of the invention are made more apparent in the ensuing Detailed Description of the Invention when read in conjunction with the attached Drawings, wherein:

FIG. 3A is a perspective view, of the present invention, wherein an aperture of an antenna array is shown;

DETAILED DESCRIPTION OF THE INVENTION

Figure 1:
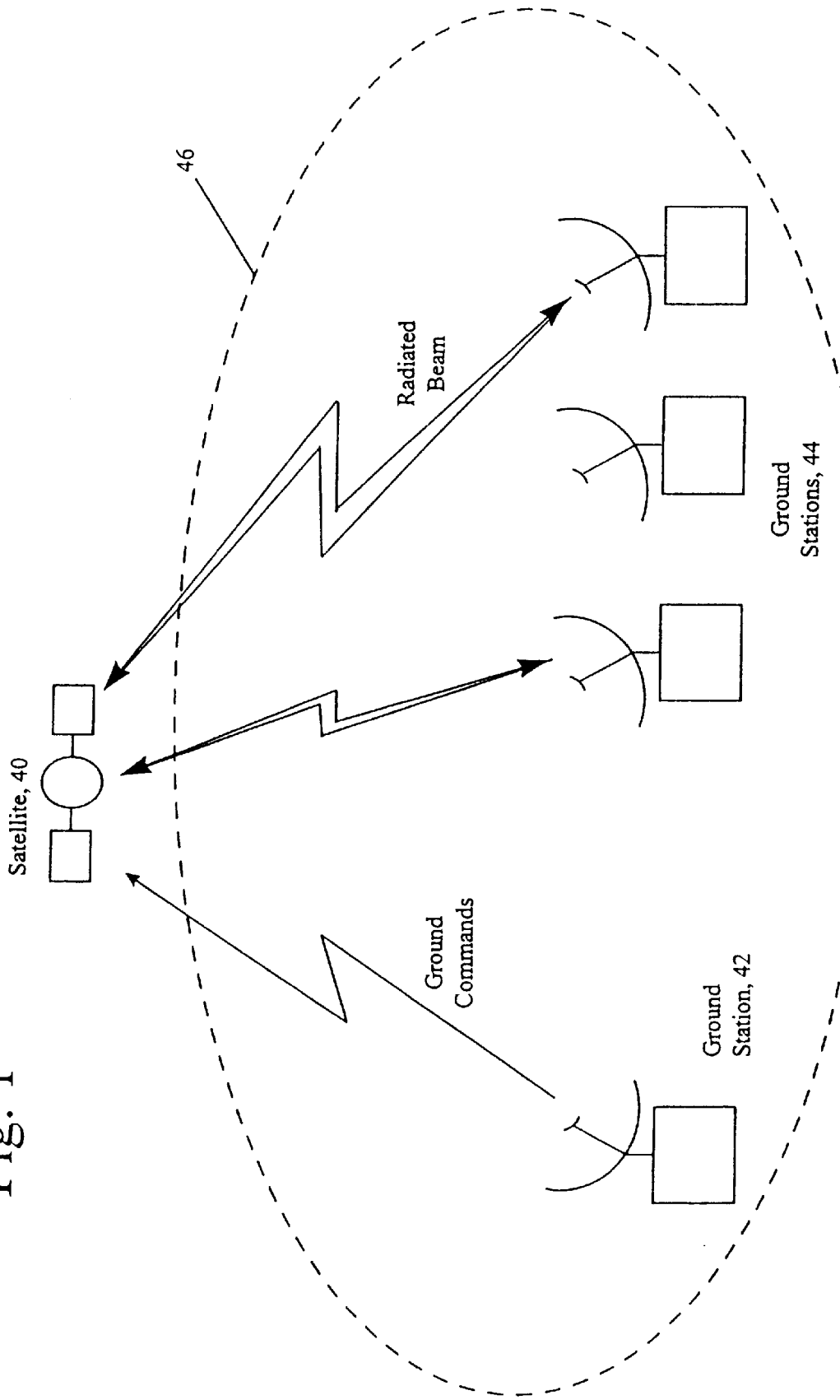
FIG. 1 is a block diagram of the satellite communication system of the present invention.

In accordance with the present invention, and referring to FIG. 1, a satellite communication system is shown. In the satellite communication system, a satellite 40 receives communication signals and commands from a ground station 42. The ground commands direct beam generation and radiation, i.e. beam width and beam placement, between the satellite 40 and one or more ground stations 44 within the satellite's coverage area 46. Commands also direct the communication signals to a desired terminal.

Figure 2A:
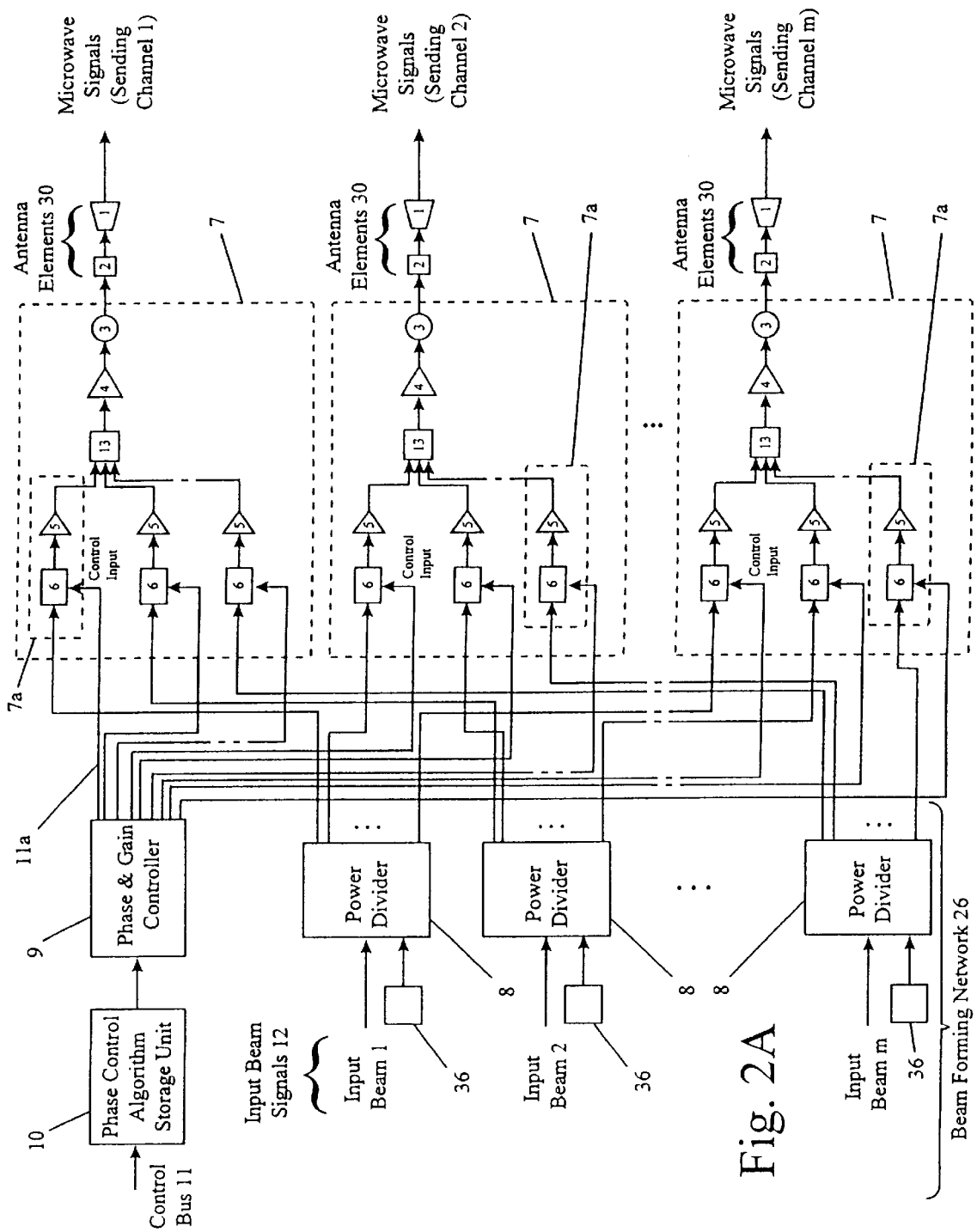
FIG. 2A is a block schematic diagram, of the present invention, as a sending array.
Figure 2B:
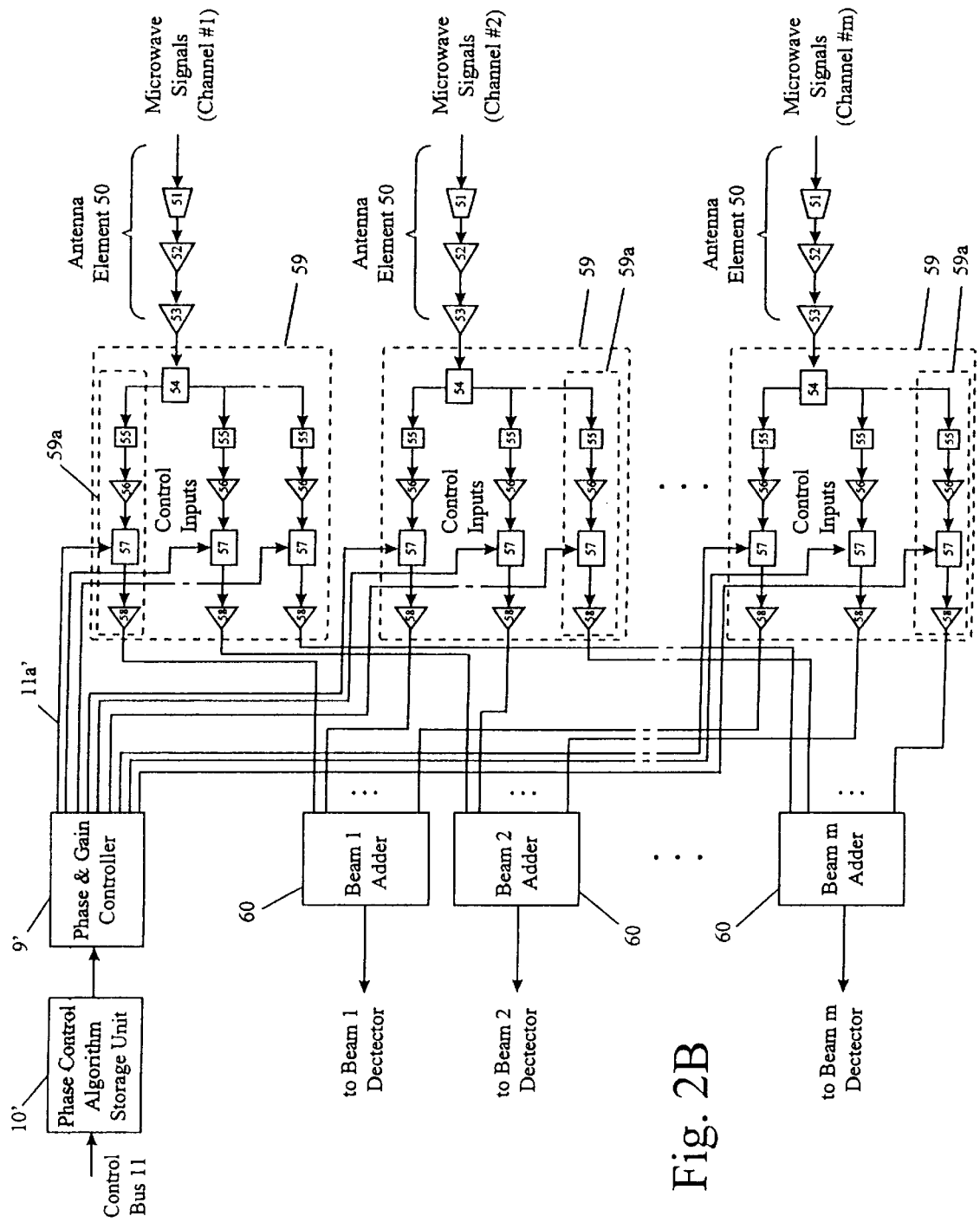
FIG. 2B is a block schematic diagram, of the present invention, as a receiving array.

In accordance with the present invention, and referring to FIGS. 2A and 2B, the satellite communication system is shown in both a sending array and a receiving array configuration, respectively.

In FIG. 2A, the sending array configuration of the satellite communication system includes a plurality of antenna elements 30, a plurality of beam forming networks 26, a plurality of feeding circuits 7, a phase and gain controller 9, and a phase control algorithm storage unit 10. The plurality of antenna elements 30 preferably include a plurality of radiators 1 and a plurality of band pass filters 2, where a band pass filter 2 is dedicated to each radiator 1. The beam forming network 26 preferably includes a plurality of stripline power dividers 8 and a plurality of power distributors 36. The feeding circuit 7 preferably includes a plurality of impedance-matching isolators 3, a plurality of solid state power amplifiers 4, a plurality of n:1 signal combiners 13, a plurality of monolithic microwave integrated circuits (MMICs) 5, and a plurality of phase shifters 6. One of the plurality of MMICs 5 and one of the plurality of phase shifters 6 form a sending chain 7a. An output signal passed by the sending chain 7a is received by the n:1 signal combiner 13. An isolator 3, a power amplifier 4, a n:1 signal combiner 13 and two or more sending chains 7a (n sending chains 7a are shown), which each include a MMICs 5 and a phase shifter 6, are dedicated to each radiator 1.

In a sending operating mode, input beam signals 12 are sent to the plurality of stripline power dividers 8. The input beam signals 12 preferably include 1 to m input beams which are to be radiated by a selected group of 1 to m radiators, wherein each selected radiator defines a sending channel. As an input beam, or a signal representing the input beam, is received by one of the plurality of stripline power dividers 8, the power divider 8 divides the signal. For example, each of the 1 to m power dividers 8 supporting the 1 to m selected radiators divides the input signal into n input signals. A portion of the divided input signal, i.e. one of the 1 to n input signals, is passed by the power divider 8 to a feeding circuit 7 supporting one of the selected group of radiators 1. The feeding circuit 7 receives the portion of the divided signal at a sending chain 7a which supports the power divider 8 and the selected radiator 1. For example, one of the 1 to n divided input signals is passed to one of the 1 to n sending chains 7a. The sending chain 7a receives the portion of the divided signal at an input to the phase shifter 6. The phase shifter 6 also receives a control input from the phase and gain controller 9 via control bus 11a. The control input may instruct one of the 1 to n phase shifters 6 to modify the phase and gain of the portion of the divided input signal, i.e. a corresponding one of the 1 to n divided input signals. Once the phase and gain of the portion of the divided input signal has been modified, the modified signal is passed from the phase shifter 6 to the MMIC 5. An output of the MMIC 5 , i.e. the sending chain output, is passed to the n:1 signal combiner 13. The n:1 signal combiner 13 combines the n modified signals from each of the 1 to m power dividers 8 into a composite signal which is then passed to the power amplifier 4 of the feeding circuit 7. Each of the power amplifiers 4 of the 1 to m feeding circuits 7 passes the composite signal to each of the isolators 3. Each of the isolators 3 then pass the composite signal to each of the 1 to m antenna elements 30 which include the band pass filter 2 and the radiator 1 of the 1 to m selected group of radiators. Thus, the 1 to n modified signals from each of the 1 to m power dividers 8 are combined and outputted to form a composite radiated beam.

Preferably, the invention employs a stochastic selection process that identifies radiator positions which comprise the selected set of radiators 1 that form the composite radiated beam. To form and position a beam at least about 5% of a maximum number of radiators 1 which can fit in an antenna aperture must radiate a substantially similar signal with phase shifts determined by the phase control algorithm. The selected beam is thus formed by signal phase addition in space. The stochastic selection process and requisite number of radiators 1 which cooperate within an aperture of a phased array antenna to produce a composite radiated beam are discussed in detail below.

In FIG. 2B, the receiving array configuration of the satellite communication system includes a plurality of antenna elements 50, a plurality of beam adders 60, a plurality of receiving circuits 59, the phase and gain controller 9', and the phase control algorithm storage unit 10'. In the receiving configuration, the plurality of antenna elements 50 preferably include a plurality of radiators 51, a plurality of low noise amplifiers 52, and a plurality of drivers 53, where a low noise amplifier 52 and a driver 53 are dedicated to each radiator 51. The receiving circuit 59 preferably includes a 1:n power splitter 54 and a plurality of receiving chains 59a. Each of the plurality of receiving chains 59a includes a band pass filter 55, a MMIC 56, a phase shifter 57, and a MMIC 58. One 1:n power splitter 54 and the plurality of receiving chains 59a, which include one band pass filter 55, one MMIC 56, one phase shifter 57, and one MMIC 58, are dedicated to each antenna element 50.

In a receiving operating mode, an incoming signal impinges on the antenna array. A portion of the incoming signal enters each of the antenna elements 50 of the array as a received signal. The phases of a selected number of the antenna elements 50 are set to receive the received signal. The received signal level is greater in the selected number of antenna elements 50 than in the antenna elements 50 not selected to receive the received signal. Preferably, n beams are processed by the select number of antenna elements 50 and supporting circuitry. By example, 1 to m antenna elements 50 and supporting circuitry, which includes 1 to m receiving circuits 59 and 1 to m beam adders 60, process each of the n beams.

As noted above, a portion of each of the n impinging beams enters each of the 1 to m selected antenna elements 50 of the array as the received signal. Within each of the selected antenna elements 50, the received signal is passed from each of the radiators 51 to each of the low noise amplifiers 52, and then from each of the low noise amplifiers 52 to each of the drivers 53. Each of the drivers 53 then passes the received signal to the each of the 1:n power splitters 54 which supports the selected antenna element 50. Each of the 1:n power splitters 54 then distributes a portion of the received signal to each of the n receiving chains 59a.

Each of the n receiving chains 59*a* receives a portion of the received signal at an input to the band pass filter 55 of the receiving chain 59*a*. As a result, n beams are processed in each of n receiving channels. The n beams are then passed along the receiving chain 59*a*, i.e. from the band pass filter 55 to the MMIC 56 to the phase shifter 57 and to the MMIC 58. It is noted that the phase and gain of the portion of the received signal is adjusted by the phase shifters 57 by control inputs received by the phase and gain controller 9 via control bus 11*a*'. The n beams are then passed to m beam adders 60 supporting the n respective receiving chains 59*a*. An output of each of the m beam adders 60 is fed to receiver detection circuitry (not shown).

Figure 3B:
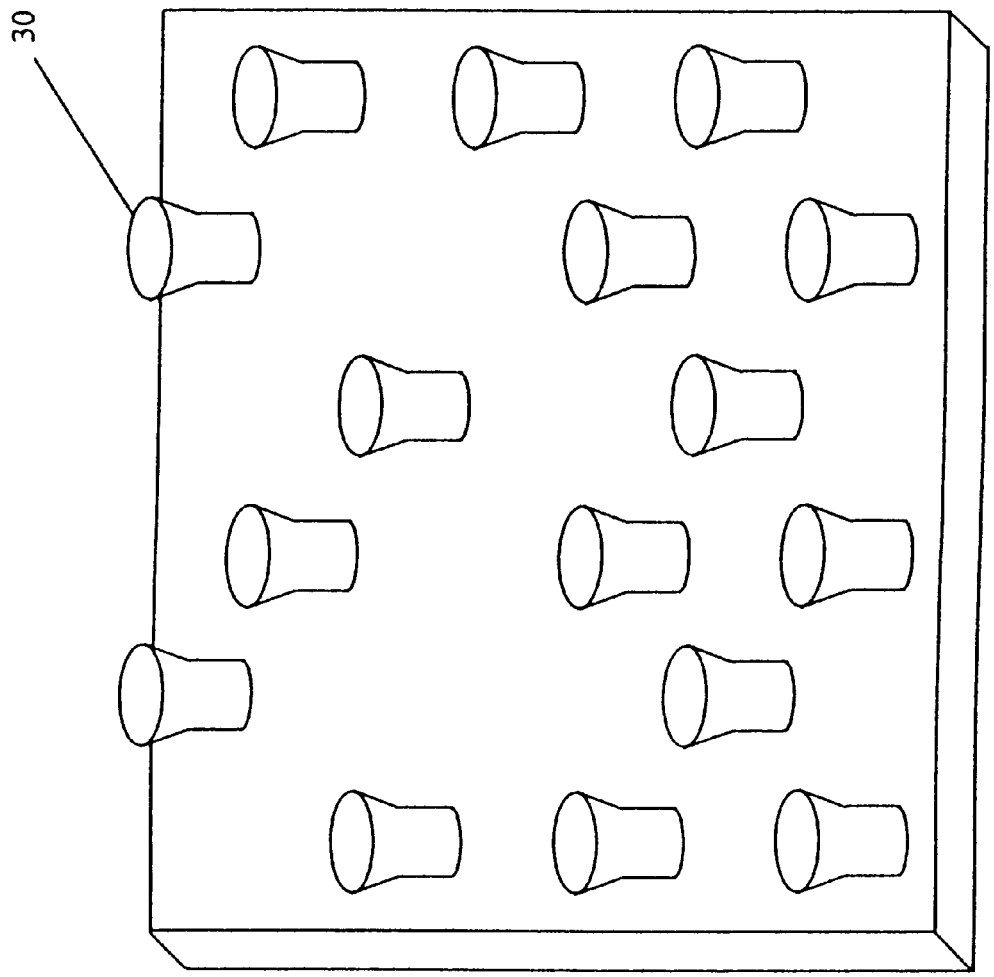
FIG. 3B is a perspective view, of the present invention, wherein antenna elements for sending or receiving a single beam are shown.

The antenna system in accordance with this invention transmits and receives microwave signals using the plurality of selected radiators 1 and 51, respectively. The selected set of radiators 1 and 51 are utilized to transmit or receive a composite microwave signal, respectively. As discussed above, the invention preferably employs a stochastic selection process that identifies radiator positions which comprise the selected set of radiators that form the composite microwave signal. The objective of the stochastic selection process is to identify individual radiating elements, i.e. the radiators 1 and 51, which define the selected set of radiators utilized to form the composite microwave signals. With reference to FIG. 3A, an aperture of a phased array antenna is shown. As shown in FIG. 3A the entire aperture is filled with individual radiating elements, for example, antenna elements 30. In accordance with the present invention, the stochastic selection process randomly identifies a predetermined percentage of the entire number of individual radiating elements which form the composite microwave signal. For example, FIG. 3B illustrates a thinned phased array antenna in which a percentage of the total possible number of individual radiating elements (shown in FIG. 3A) are randomly selected with the stochastic selection process to form a single composite beam. The stochastic selection process accomplishes the objective of identifying the predetermined percentage of individual radiating elements by employing an algorithm, for example a probability distribution, which randomly determines the placement of radiators within the array. The selected placement minimizes interference with adjacent beams while maximizing power efficiency of the antenna system. Each selected placement of radiators is independent and the beams are steerable within the antenna configuration limitations.

It can be appreciated that many separate sets of radiating elements may be selected from the entire number of individual radiating elements and thus, multiple beams may be formed within an aperture of the phased array antenna. In particular, since a radiating element may operate over a range of frequencies, each individual radiating element can operate at distinct frequencies to form separate composite beams. For example, one radiating element may operate in a first set of radiators. The first set of radiators cooperate to transmit or receive a first composite beam. The one radiating element may also be included in a second set of radiators. The second set of radiators may include some, all, or no other radiating elements of the first set of radiators. The second set of radiators cooperate to transmit or receive a second composite beam.

In one embodiment of the invention, each beam is assigned to a set of stochastically selected radiators. The assignment of radiating elements within a selected set of radiators may be changed by ground commands and a modified phase control algorithm up-loaded to the satellite 40.

It is noted that a thinned phased array antenna may generate only a single beam, and be, for example, about 50% or 75% full. The thinned phased array antenna reduces the weight and cost of the antenna by using fewer radiators to transmit or receive a composite beam. The thinned array obtains performance similar to that of a full array, and if the per element power of the thinned and full arrays are the same, the thinned array radiates less power than the full array. Additionally, a perceived benefit in the thinned array implementation is a reduction in the amount of labor required to both fabricate and calibrate the thinned multiple beam phased array antenna. Since the beams are formed by phase control, any non-uniformity in the construction of the array may be compensated for by phase adjustments thus reducing the need for precision assembly.

In the sending array configuration of the present invention, the radiators 1 of antenna elements 30 may be designed to illuminate a microwave mirror (reflector) or lens to further control the geographical destination of the signals. In a multiple beam antenna, each transmitting element operates as an independent radiator. A composite beam of desired shape, direction and size is formed in space by phase addition of the radiated signals from a set of independent radiators 1. In an exemplary embodiment of the present invention, 1,460 radiators 1 form 20 separate and distinct composite, radiated beams; these beams may be simultaneous. Thus, in this exemplary embodiment, 73 randomly positioned radiators 1 are utilized to form each composite, radiated beam.

In the sending array configuration, the plurality of antenna elements 30 also include the plurality of band pass filters 2, one band pass filter 2 supporting each radiator 1. The band pass filters 2 process the signals formed at the beam forming network 26 and received from the feeding circuit 7. The band pass filters 2 pass only the signals within a desired band of frequencies. The desired band of frequencies is chosen to ensure that there is no interference with other communications systems in adjacent frequency bands. Signals received by the band pass filters 2 which are not within the desired band of frequencies are rejected. Thus, in the present invention, each radiator 1 is coupled to a band pass filter 2 that only passes signals, from the respective beam forming network 26, which fall within a desired band of frequencies. Preferably, each band pass filter 2 is composed of high "Q" resonators. The high Q resonators within each filter are electromagnetically coupled to one another to form two orthogonal band pass filters. Preferably, these filters pass signals with frequencies in a range of, for example, about 18.950 GHz to 20.200 GHz, and reject signals at all other frequencies. The teaching of this invention is not, however, limited to this type of band pass filter 2 configuration, but may be implemented in several different ways within the preferred range to provide the desired pass band. The teachings of this invention is also not limited to only this particular spectral region, or band of frequencies. In accordance with the present invention the band pass filters pass signals within a frequency range of, for example, about 10 GHz to 100 GHz.

Figure 4A:
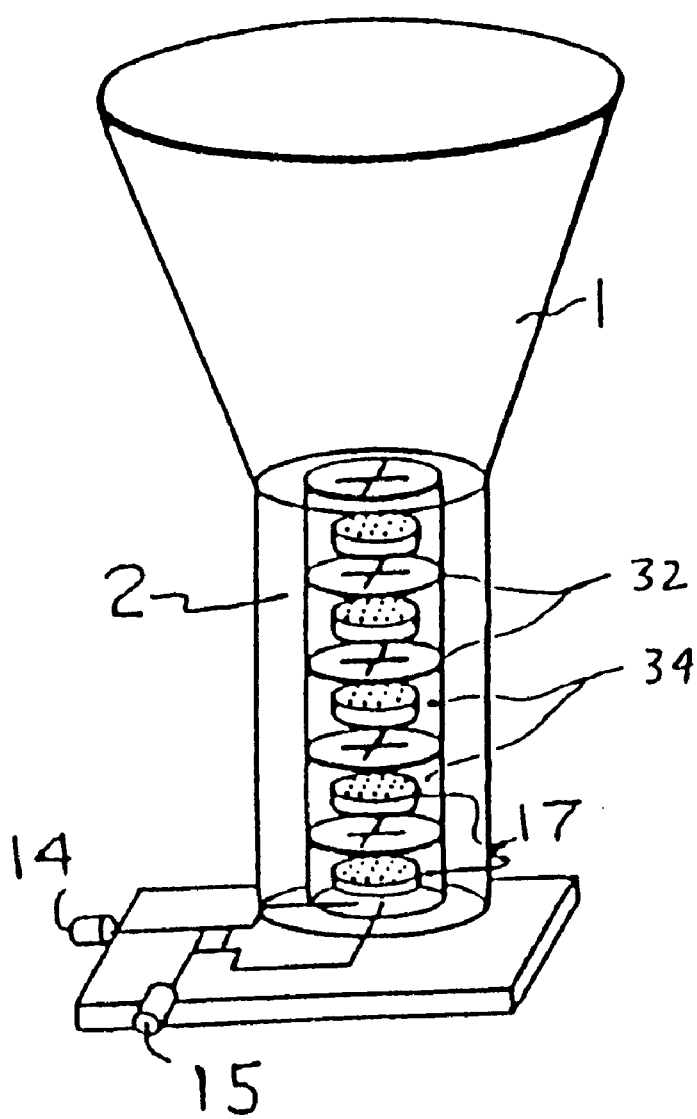
FIG. 4A is a perspective view, of the present invention, wherein a preferred embodiment of an antenna element is shown.

In the preferred embodiment, each radiator 1 and a band pass filter 2 are integrated as shown in FIG. 4A. Each radiator 1 is preferably contoured as a horn and constructed of a lightweight material, by example, a copper plated graphite epoxy or finely machined aluminum. The horn includes a top and a base, and possesses features for balanced E and H plane propagation. The top of each horn is shaped like an inverted, truncated pyramid which is open at one end, the open end being circular. The end opposite the open end of the inverted, truncated pyramid is mounted to the base of the horn. The base of the horn is a conical, or square, cross-section that is capable of supporting the top of the horn. The base is also capable of enclosing the band pass filters 2.

Each band pass filter 2 preferably comprises a plurality of poles. Each pole includes a dual mode elliptical filter 32 and a dielectric resonator 17. Further, each pole is disposed within a cavity 34, and each cavity 34 is coupled by an iris to an adjacent one of the cavities. The configuration of poles is enclosed within the base of each radiator 1.

The dual mode elliptical filters 32 allow a right-hand circular and a left-hand circular polarized channel to be launched into the radiating horn. This configuration results in little frequency loss and provides sufficient isolation to enable dual polarization frequency reuse. Preferably, high Q dielectric resonators 17 with a high dielectric constant, by example a dielectric constant of ten, may be used to reduce the size and weight of the band pass filters 2, and improve their temperature stability. The frequency of the band pass filters 2 is established by the size of dielectric resonators 17 and, to a lesser degree, by the dimension of the cavities 34 in which they are disposed. The bandwidth and resonant mode of the band pass filters 2 is established by the size and shape of the irises that couple one cavity 34 to another, the dimensions of the radiator's horn, as well as the characteristics of probes that couple the first stage of the band pass filter 2 to the impedance-matching isolator 3.

Figure 4B:
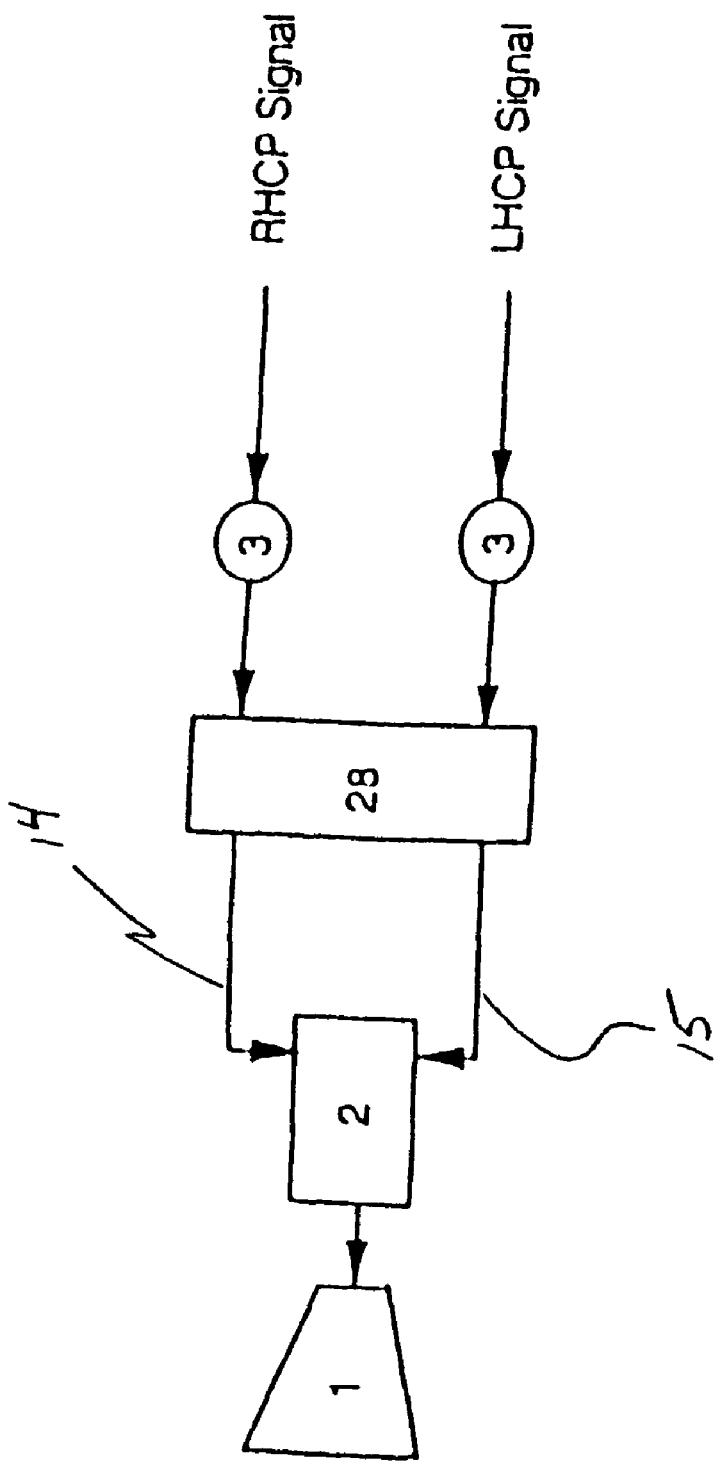
FIG. 4B is a block diagram illustrating the present invention radiating two signals simultaneously in quadrature polarizations, i.e. left hand and right hand circular polarizations.

Preferably, the radiator 1 and band pass filter 2, as shown in FIGS. 4A and 4B, support both the right-hand and the left-hand circular polarization. The teaching of this invention is not, however, limited to this configuration, but may be implemented to additionally support only the left-hand circular polarization or only the right-hand circular polarization. Depending on the polarization desired, the appropriate filter input, a right-hand circular polarization input 14 or a left-hand circular polarization input 15, is coupled to the impedance-matching isolator 3. To support both the left-hand and the right-hand circular polarizations, both inputs 14 and 15 are connected to the impedance-matching isolator 3 by means of a 90° hybrid 28. This embodiment is shown in FIG. 4B.

Figure 4C:
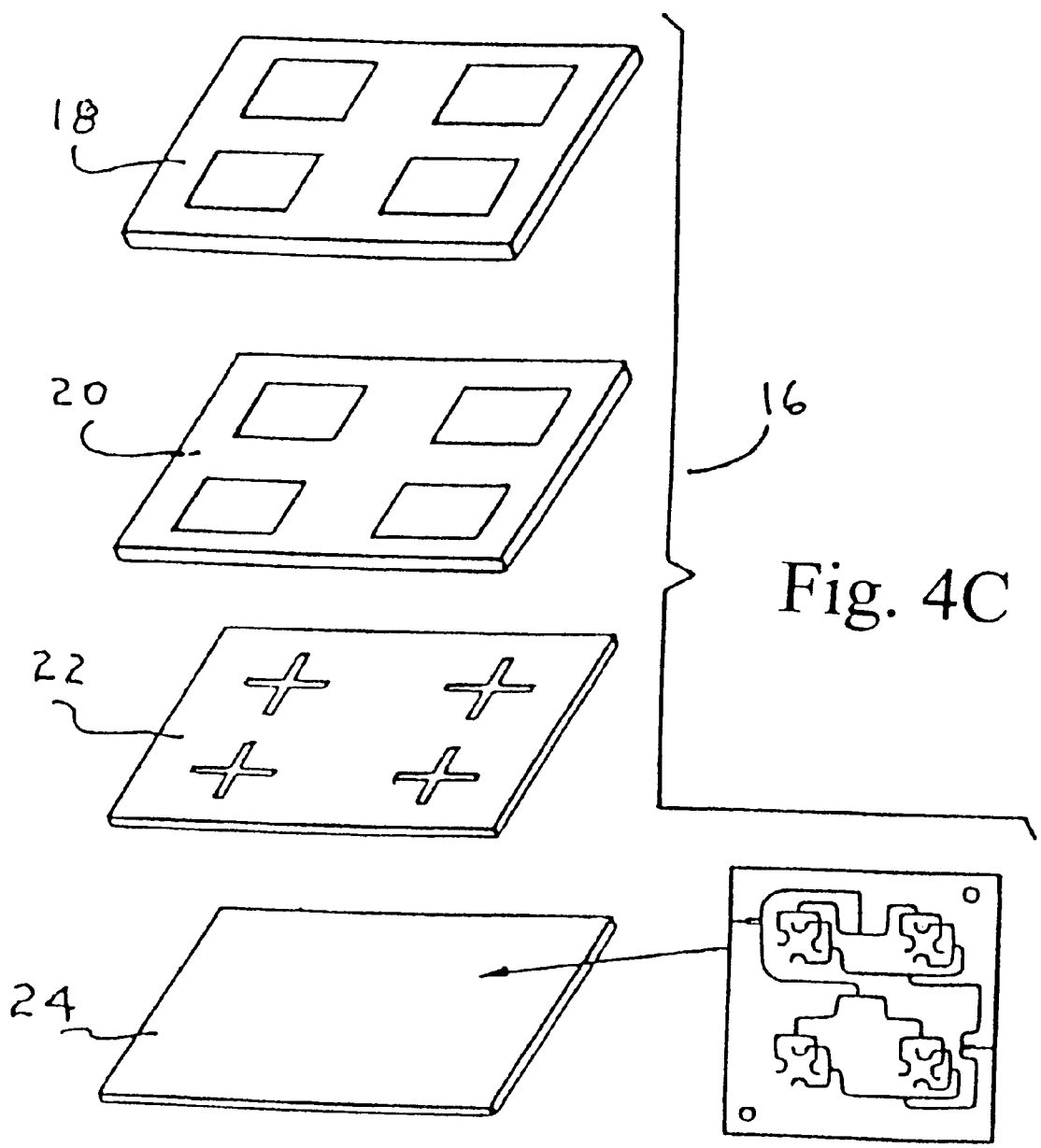
FIG. 4C is a perspective view, of the present invention, wherein an alternate embodiment of a radiator is shown.

In an alternate embodiment, as shown in FIG. 4C, each radiator 1 comprises a patch array. Preferably, the patch array is a low profile array feed cluster cell 16. The cluster cell 16 has four elements, a first layer of radiating patch elements 18, a second layer of radiating patch elements 20, a layer of coupling slots 22, and a power distribution network 24. The first layer of radiating patch elements 18 is disposed in a parallel plane above the second layer of radiating patch elements 20.

Both the first layer 18 and the second layer 20 are disposed in a parallel plane above the layer of coupling slots 22. Finally, the first layer 18, the second layer 20, and the coupling slot layer 22 are disposed above the power distribution network 24. The structure of the distribution network 24 establishes the polarizations launched from the patch arrays. On transmission, the microwave signal is received at the cluster cell 16 from is the band pass filter 2. The cluster cell 16 receives these signals at the power distribution network 24. The power distribution network 24 passes the signal, which is the output of the radiator 1, through the three parallel layers, the coupling layer 22, the second radiating layer 20, and the first radiating layer 18.

It can be appreciated that the radiator embodiments illustrated in FIGS. 4A, 4B and 4C can be implemented in each of the sending and receiving operating modes. The radiators of each configuration operate in a substantially similar frequency band. In the sending operating mode each of the radiators preferably operates in a frequency range of, for example, about 18 to 20 GHz. In the receiving operating mode each of the radiators preferably operates at a frequency of, for example, about 28 GHz.

A difference in the sending and receiving configurations in the antenna system of the present invention is seen in the functioning of the phase control algorithm. That is, in the sending operating mode the phase and gain controls are adjusted to form the composite radiated beam, while in the receiving operating mode the phase and gain controls the received beam from signals processed by the plurality of receiving circuits.

Referring again to FIGS. 2A and 2B, the antenna system of this invention includes control buses 11a and 11a' that pass beam positioning and beam width control information derived from the phase control algorithm to each feeding circuit 7 and each receiving circuit 59, respectively. The control buses 11a and 11a' are connected to each feeding circuit 7 and receiving circuit 59 at control inputs of respective phase shifters 6 and 57, and carry the control information as digital control signals. The digital control signals govern the gain and phase settings of the respective phase shifters 6 and 57. As discussed above, the digital control signals are established by the phase control algorithm, which is stored on the satellite 40 and modified from the ground station 42. The phase control algorithm passes commands to the satellite 40 via control bus 11. These ground commands are stored in the phase control algorithm storage units 10 and 10'. The phase control algorithm storage units 10 and 10', in cooperation with the phase and gain controllers 9 and 9', transmits the ground commands as digital control signals to ensure the desired beam placement and beam width information is available to the respective phase shifters 6 and 57. Additionally, as taught by the present invention, the desired signal directions and coverage areas are determined by the control information, preferably embodied in phase settings, at the respective phase shifters 6 and 57. The phase settings ensure high gain service to selected sites. The control buses 11a and 11a' are preferably comprised of planar patterns of leads interconnecting the feeding circuits 7 and the receiving circuits 59 for gain/phase control. The planar patterns of leads form ribbon-like structures that permits conductors to pass under each of the feeding circuits 7 and the receiving circuits 59 with only one or two layers of etched copper.

In the preferred embodiment of the present invention, each of the feeding circuits 7 and the receiving circuits 59 have a unique address determined by, for example, a pattern of open, or shorted, connections to ground. A feeding circuit 7 or receiving circuit 59 determines if it is the intended recipient of the digital control signals, which it receives via the control buses 11a and 11a', by matching its address to the address associated with each control signal. If an address of one of the feeding circuits 7 or the receiving circuits 59 does not match an address of a control signal, then the feeding circuit 7 and receiving circuit 59 ignores the signal. However, if the address of the feeding circuit 7 or receiving circuit 59 does match the address of the control signal, then the feeding circuit 7 or receiving circuit 59 executes the command embedded in the control signal.

For example, a digital control signal instructs a particular feeding circuit 7, whose address is encoded within the digital signal, to modify an inputted beam it receives from the power divider 8 which supports the feeding circuit 7. The particular feeding circuit 7 first determines that it is the recipient of the digital control signal over control bus 11*a* and then implements the control signal by varying the phase and gain of the inputted beam at its respective phase shifter 6. The modified beam passes from the phase shifters 6 to the MMICs 5, on to the n:1 signal combiner 13, through the power amplifier 4, next to the isolator 3, then through the band pass filter 2, and finally to the radiator 1 for transmission. Thus, the phase control algorithm, via bus 11, the storage unit 10, the phase and gain controller 9, and control bus 11*a*, independently controls the beam sent to the radiators 1 and maintains the desired levels of signal radiation from each radiator 1.

In the preferred embodiments of the sending or receiving array configurations, only a relatively small percentage of the total number of radiators 1 are affected by changes in a single radiated beam. For example, in the exemplary sending array embodiment outlined above, only about 5%, or 73, of the 1460 radiators are effected by a change in 1 of the 20 separate and distinct radiated beams.

Figure 5:
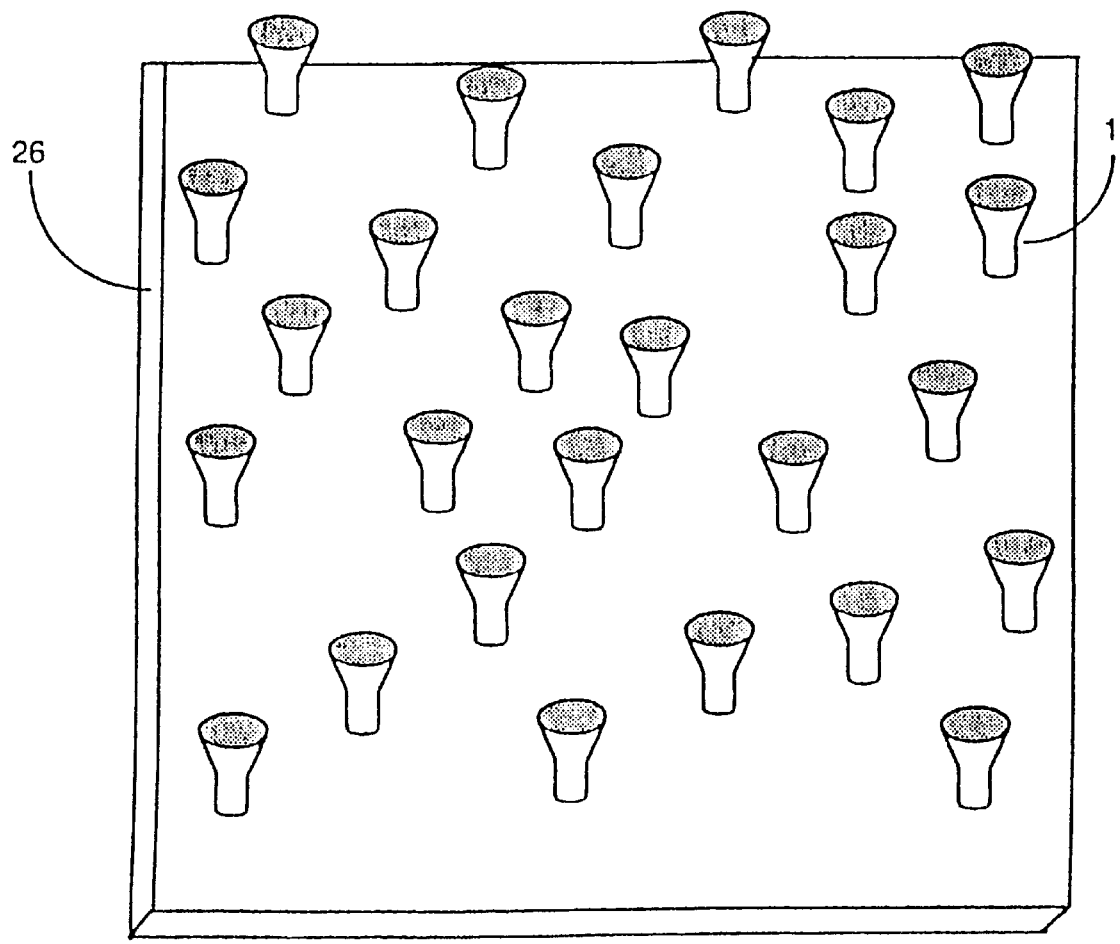
FIG. 5 is a perspective view, of the present invention, wherein the antenna elements and beam forming network for transmitting a single beam is shown.
Figure 6:
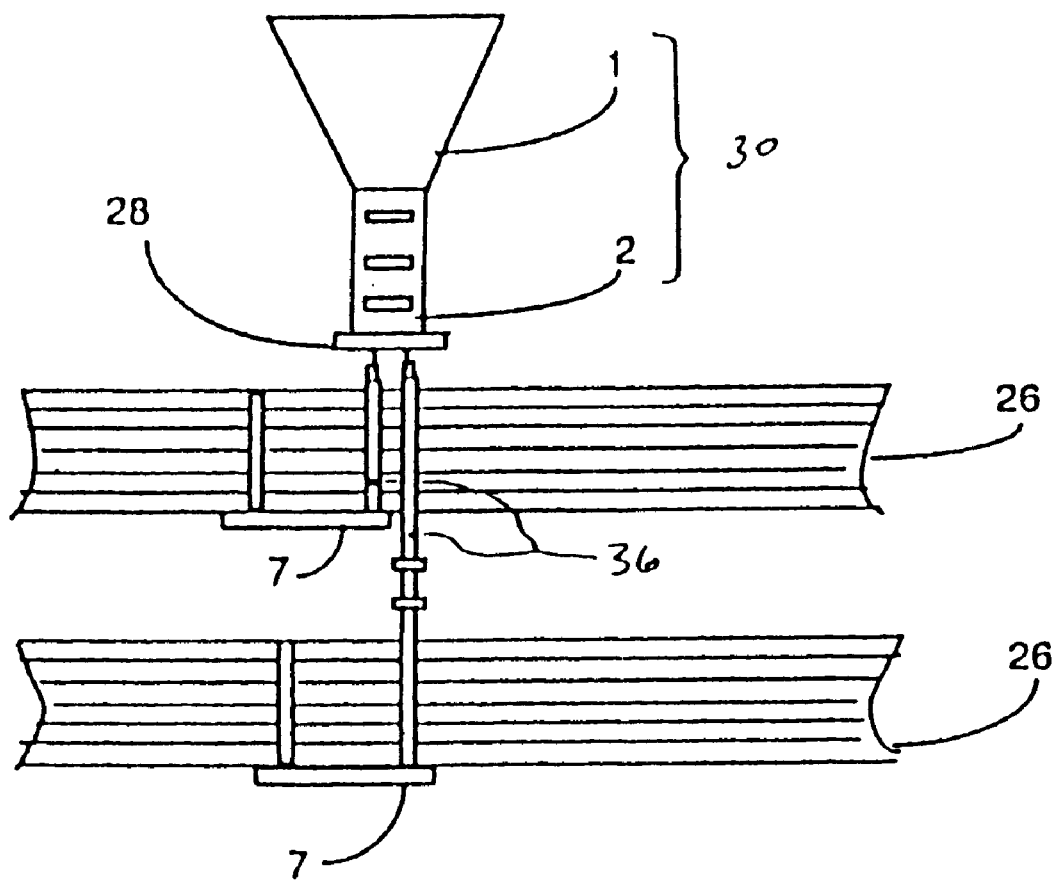
FIG. 6 is a cross-sectional side view of a preferred embodiment of the present invention, wherein the beam forming networks and feeding circuits for a single antenna element are shown radiating quadrature polarized signals.

Further in accordance with the sending array configuration of the present invention, and referring to FIGS. 5 and 6, the integrated satellite communication system includes the plurality of antenna elements 30, the plurality of beam forming networks 26, and the plurality of feeding circuits 7. FIG. 5 provides a perspective view of a preferred embodiment of the present invention for a single beam. In FIG. 5 the plurality of radiators 1 and the beam forming network 26 are highlighted, remaining portions of the present invention, that is, the feeding circuits 7, are constructed in the beam forming network layers which support the plurality of radiators 1. FIG. 6 provides a cross-sectional side view of the antenna system. This view illustrates an antenna element 30, a feeding circuit 7, and a beam forming network 26. Additionally, FIG. 6 shows the 90° hybrid 28 mounted to the base of the radiator 1. As discussed above, the hybrid enables both the left-hand and right-hand circular polarization. Thus, FIG. 6 illustrates a beam forming network 26 and a feeding circuit 7 configuration for each polarization. Also FIG. 6 shows the feeding circuit 7 mounted to the base of the radiator 1, at the hybrid 28, by semi-rigid coaxial cables 36.

Figure 7:
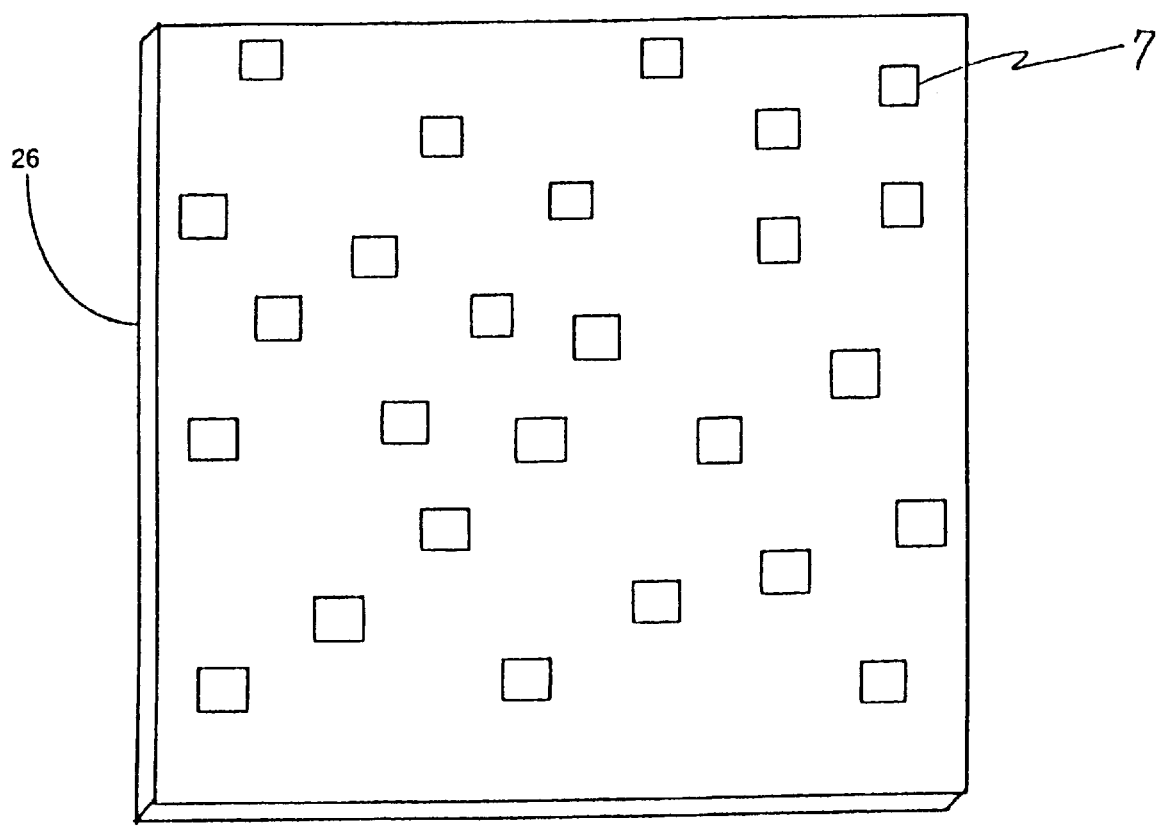
FIG. 7 is a bottom perspective view of a preferred embodiment of the present invention wherein the feeding circuits are shown.

FIG. 7 illustrates a preferred layout for the feeding circuits 7 of a sending configuration of the present invention which supports the transmission of a single beam. As shown in FIG. 7, each feeding circuit 7 has a similar semiconductor chip packaging and is mounted to a beam forming network 26 layer by semi-rigid coaxial cable and solder points.

Figure 8:
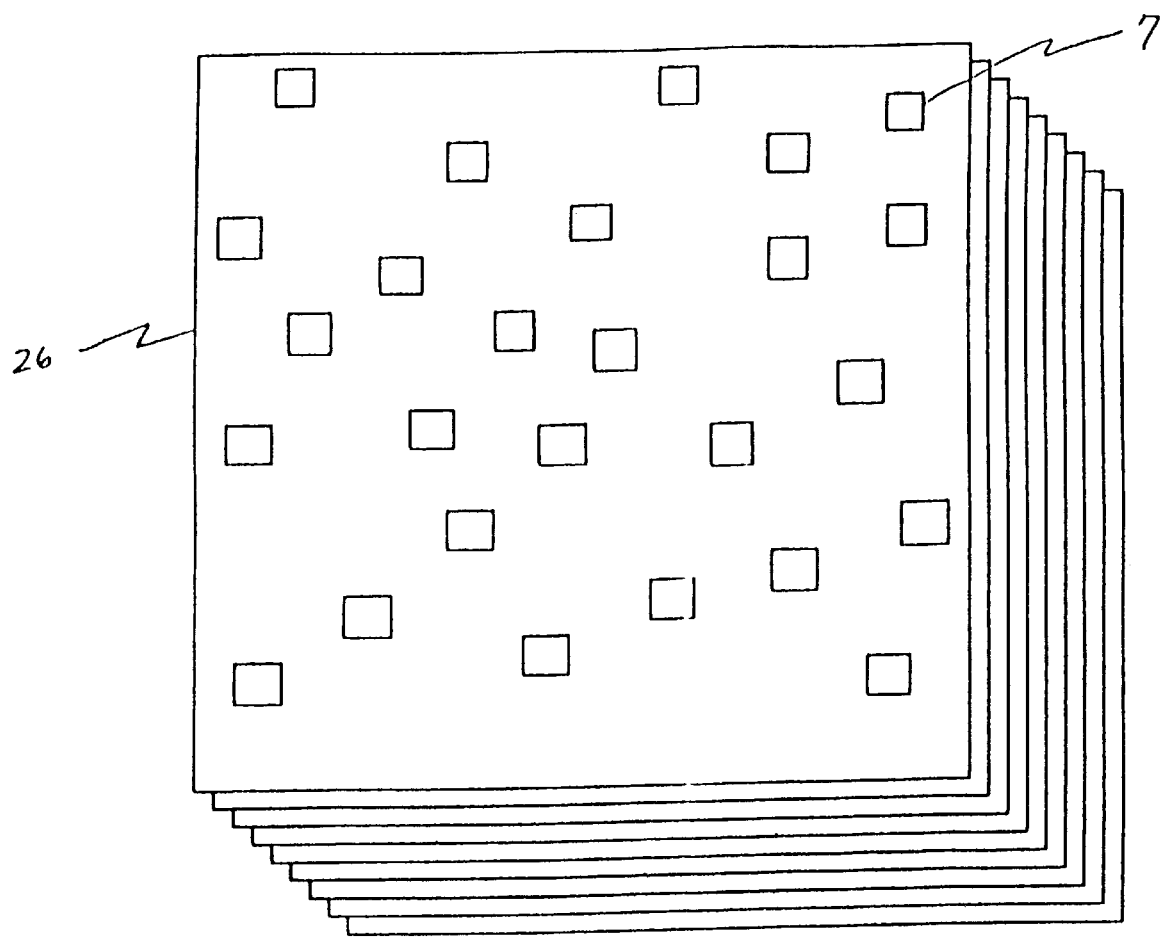
FIG. 8 is a perspective bottom view, of a preferred embodiment, of the beam forming networks and feeding circuits for a single beam looking from the feeding circuits towards the front of the antenna array.

FIG. 8 provides a perspective view of FIG. 7 and highlights the plurality of beam forming networks 26 which are arranged in layers.

While the invention has been particularly shown and described with respect to preferred embodiments thereof, it will be understood by those skilled in the art that changes in form and details may be made therein without departing from the scope and spirit of the invention.

What is claimed is:

1. A circuit package comprising more than one signal input, a control bus control input for coupling to a control bus and a phased array element output for coupling to an element of a phased array antenna, wherein said circuit package controllably amplifies and phase shifts, in response to a control signal received at said control bus control input, a signal received at each of said more than one signal input to produce, at said phased array element output, a portion of a beam to be transmitted.

2. A circuit package comprising a phased array element input for coupling to an element of a phased array antenna, a control bus control input for coupling to a control bus and more than one output, wherein said circuit package controllably amplifies and phase shifts, in response to a control signal received at said control bus control input, a beam received at said phased array element input to produce, at each of said more than one output, a portion of said received beam.

* * * * *